(12) United States Patent
Kanevsky et al.

(10) Patent No.: US 6,587,818 B2
(45) Date of Patent: *Jul. 1, 2003

(54) SYSTEM AND METHOD FOR RESOLVING DECODING AMBIGUITY VIA DIALOG

(75) Inventors: Dimitri Kanevsky, Ossining, NY (US); Taufique Samdani, Tarrytown, NY (US); Wlodek Zadrozny, Tarrytown, NY (US); Alexander Zlatsin, Yorktown Heights, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/428,949

(22) Filed: Oct. 28, 1999

(65) Prior Publication Data

US 2003/0004714 A1 Jan. 2, 2003

(51) Int. Cl.[7] .......................... G01L 15/22; G06F 17/27
(52) U.S. Cl. .......................... 704/251; 704/252; 706/52; 382/187
(58) Field of Search ................................. 704/243, 244, 704/251, 252, 255, 270, 275; 379/88.01, 88.03; 706/45, 46, 52; 382/187, 188, 189

(56) References Cited

U.S. PATENT DOCUMENTS

| | | | | |
|---|---|---|---|---|
| 5,778,344 A | * | 7/1998 | Attwater et al. | 704/10 |
| 6,018,736 A | * | 1/2000 | Gilai et al. | 704/239 |
| 6,035,275 A | * | 3/2000 | Bröde et al. | 704/275 |
| 6,044,347 A | * | 3/2000 | Abella et al. | 704/272 |
| 6,182,039 B1 | * | 1/2001 | Rigazio et al. | 704/257 |
| 6,219,646 B1 | * | 4/2001 | Cherny | 704/277 |
| 6,230,132 B1 | * | 5/2001 | Class et al. | 704/270 |
| 6,246,981 B1 | * | 6/2001 | Papineni et al. | 704/235 |
| 6,269,153 B1 | * | 7/2001 | Carpenter et al. | 379/88.02 |
| 6,278,968 B1 | * | 8/2001 | Franz et al. | 704/277 |
| 6,421,672 B1 | * | 7/2002 | McAllister et al. | 704/246 |
| 6,487,545 B1 | * | 11/2002 | Wical | 706/45 |
| 6,501,937 B1 | * | 12/2002 | Ho et al. | 434/362 |

* cited by examiner

Primary Examiner—Marsha D. Banks-Harold
Assistant Examiner—Martin Lerner
(74) Attorney, Agent, or Firm—Charles W. Peterson, Jr.; Louis J. Percello

(57) ABSTRACT

A method of language recognition wherein decoding ambiguities are identified and at least partially resolved intermediate to the language decoding procedures to reduce the subsequent number of final decoding alternatives. The user is questioned about identified decoding ambiguities as they are being decoded. There are two language decoding levels: fast match and detailed match. During the fast match decoding level a large potential candidate list is generated, very quickly. Then, during the more comprehensive (and slower) detailed match decoding level, the fast match candidate list is applied to the ambiguity to reduce the potential selections for final recognition. During the detailed match decoding level a unique candidate is selected for decoding. Decoding may be interactive and, as each ambiguity is encountered, recognition suspended to present questions to the user that will discriminate between potential response classes. Thus, recognition performance and accuracy is improved by interrupting recognition, intermediate to the decoding process, and allowing the user to select appropriate response classes to narrow the number of final decoding alternatives.

23 Claims, 3 Drawing Sheets

US 6,587,818 B2

SYSTEM AND METHOD FOR RESOLVING DECODING AMBIGUITY VIA DIALOG

BACKGROUND OF THE INVENTION

1. Field of the Invention

The present invention is related to language recognition methods for understanding language input from a user, and more particularly, to a method and apparatus for improving language recognition performance and accuracy by resolving ambiguities in the language input using an intermediate to the recognition process.

2. Background Description

Existing language recognition decoders such as automatic speech recognition (ASR) systems, automatic handwriting recognition (AHR) systems and machine translation (MT) systems must deal with large numbers of decoding alternatives in their particular decoding process. Examples of these decoding alternatives are candidate word lists, N-best lists, e.g., for ASR. Because the number of decoding alternatives may be so large, decoding errors occur very frequently.

There are several approaches to minimizing such errors. Typically, in these approaches, users are allowed to correct errors only after the decoder has produced an output. Unfortunately, these approaches still result in too many decoding errors and a cumbersome process, i.e., requiring users to correct all of the errors which, ideally, would be caught by the system.

Other approaches include systems such as using ASR in a voice response telephone system to make appointments or place orders. In such a voice response system, after the user speaks the system repeats its understanding and provides the user with an opportunity to verify whether the system has recognized the utterance correctly. This may require several iterations to reach the correct result.

So, a recognition system can misrecognize the phrase "meet at seven" having a temporal sense as being "meet at Heaven" which may have a positional sense, e.g., as the name of a restaurant. Unfortunately, using these prior art systems requires the user to do more than just indicate that the recognition is incorrect. Otherwise, the recognition system still has not been informed of the correct response. In order to improve its recognition capability, the system must be informed of the correct response. Further, repeating the recognition decoding or querying other alternative responses increases user interaction time and inconvenience.

Thus, there is a need for language response systems with improved recognition accuracy.

SUMMARY OF THE INVENTION

It is a purpose of the invention to provide a method and system for improving language decoding performance and accuracy;

It is another purpose of the invention to resolve language decoding ambiguities during voice recognition, thereby improving language decoding performance and accuracy.

The present invention is a method of language recognition wherein decoding ambiguities are identified and at least partially resolved intermediate to the language decoding procedures. The user is questioned about these identified decoding ambiguities as they are being decoded. These identified decoding ambiguities are resolved early to reduce the subsequent number of final decoding alternatives. This early ambiguity resolution significantly reduces both decoding time and the number of questions that the user may have to answer for correct system recognition. In the preferred embodiment speech recognition system there are two language decoding levels: fast match and detailed match. During the fast match decoding level a comparatively large potential candidate list is generated, very quickly. Then, during the more comprehensive (and slower) detailed match decoding level, the fast match candidate list is applied to the ambiguity to reduce the potential selections for final recognition. During the detailed match decoding level a unique candidate is selected for decoding. In one embodiment decoding is interactive and, as each ambiguity is encountered, recognition is suspended to present questions to the user that will discriminate between potential response classes. Thus, recognition performance and accuracy is improved by interrupting recognition, intermediate to the decoding process, and allowing the user to select appropriate response classes to narrow the number of final decoding alternatives.

DETAILED DESCRIPTION OF A PREFERRED EMBODIMENT OF THE INVENTION

Figure 1:
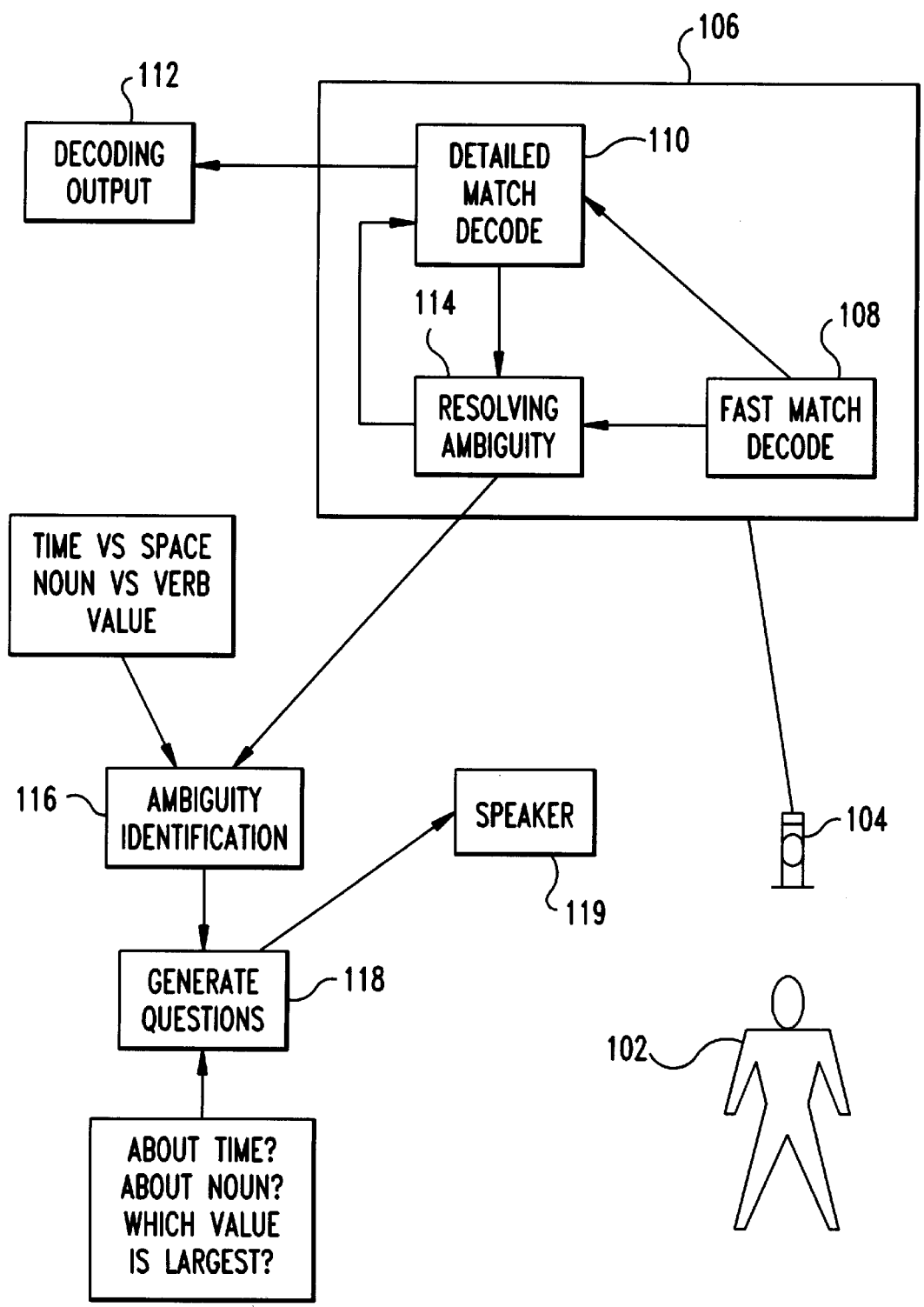
FIG. 1 is a structural diagram for the preferred embodiment language recognition system with intermediate decoding ambiguity recognition.

Turning now to the drawings and more particularly FIG. 1 shows a structural diagram for the preferred embodiment language recognition system 100 with intermediate decoding ambiguity recognition. The decoding system may be, for example, an automatic speech recognition (ASR) system, an automatic handwriting recognition (AHR) system or, a machine translation (MT) system.

In the preferred embodiment speech recognition system 100 there are two decoding levels: fast match and detailed match. During the fast match decoding level a large approximate candidate list is generated very quickly. Then, during the more comprehensive (and slower) detailed match decoding level the fast match candidate list is applied for final recognition. During the detailed match decoding level a unique candidate is decoded and selected.

In this example a user 102 is shown speaking into a microphone 104 to provide language input to an automatic speech recognition system 106. The speech recognition system includes a fast match speech processing module 108 for the fast match, which identifies ambiguous words or phrases, and a detailed match decode processing module 110 for the detailed match. The speech is passed directly to the detailed match processing module 110 until the fast match speech processing module 108 encounters an ambiguity. When an ambiguity is encountered, the ambiguity is classified and the processed speech is passed to the detailed match decoding module 110 for decoding. Then, the result is output 112, e.g., on a video display.

However, at some point during input, the user 102 may include an ambiguous statement, which the fast match module 108 identifies, initially, and passes the partially decoded ambiguous input to resolve the ambiguity in module 114. Ambiguities may be identified initially, for example, by similar sounding words for speech, or by similarly spelled words in handwritten text. Then, in module 116 potential characteristic choice classes are identified. Choice classes may include for example, time/space or noun/verb. Then, questions are generated in 118. Answers to the questions 118 will serve to resolve the ambiguity and to classify the type of statement/phrase being considered. These questions 118 are passed back to the user 102, e.g. verbally on speaker 119, and the user's response serves to classify the ambiguity. The resulting partially decoded speech with the classified ambiguity is passed on to detailed match decode 110 for final decoding.

As each ambiguity is identified, the system passes appropriate questions to the user 102 to classify the ambiguities prior to passing the user input on to the detailed match module 110 for further decoding. Thus according to the present invention, these classified decoding ambiguities are resolved early in the recognition process to reduce the ultimate number of decoding alternatives presented to the user. This early ambiguity resolution significantly reduces overall decoding time and, further, reduces the overall number of questions passed to the user to ultimately guide system recognition to produce the desired result.

For example, simple key words such as prepositions may be used to initially identify ambiguities. Thus, if the word "at" is encountered by the dialog conversational system, there may be several potential decoding alternatives. The key word "at" may be appropriate when referring to time and space functions. So, for each occurrence of "at" the system may present the user with a question like: "Are you talking about a place where to meet?" If the user answers "YES," then only decoding alternatives related to "space" are considered in the final detailed match decoding module 110. Otherwise, alternatives related to "time" are considered. In general any response that could be answered with more than one of who, what, when, where are potentially ambiguous.

In one embodiment of the invention decoding is interactive and, as each ambiguity is encountered, recognition is suspended to allow presenting questions to the user to discriminate between potential selection classes. So, in the above example, discerning between "meet at heaven" and "meet at seven," by posing an intermediate question to classify the phrase (e.g., "A time?") eliminates one decoding choice and results in decoding the correct phrase. Thus, recognition performance and accuracy is improved by selecting appropriate classes that narrow the field of potential final decoding alternatives, intermediate to the decoding process.

In a more elaborate example, several candidates may be available for space, e.g. meet at heaven, meet in hell, and for time e.g., meet at seven, meet at six, all produced during the fast match decoding of speech processing module 108. The same classification question (A time?) narrows the selection to two candidates: either the spatial candidates, meet at heaven and meet in hell; or, the temporal candidates, meet at seven and meet at six. After answering the questions to narrow the set of candidates, decoding continues normally in the detailed match decoding module 110 until a single candidate is selected from this narrowed set.

In a typical prior art language decoder, only the detailed match decode of decoding process 110 was applied to find a best choice. However, for the preferred embodiment method, decoding is interrupted as soon as an ambiguity is identified by the fast match speech processing module 108. Then, the appropriate question is identified and presented to the user 102 to narrow the list of fast match choices, before continuing with the detailed match of the decoding process module 110 using the narrowed list. Decoding ambiguities may include things such as, whether a particular phrase describes a time or space relationship; whether the phrase describes a noun, verb or adjective; and/or, what value the phrase describes, e.g., time, length, weight, age, period, price, etc.

Figure 2:
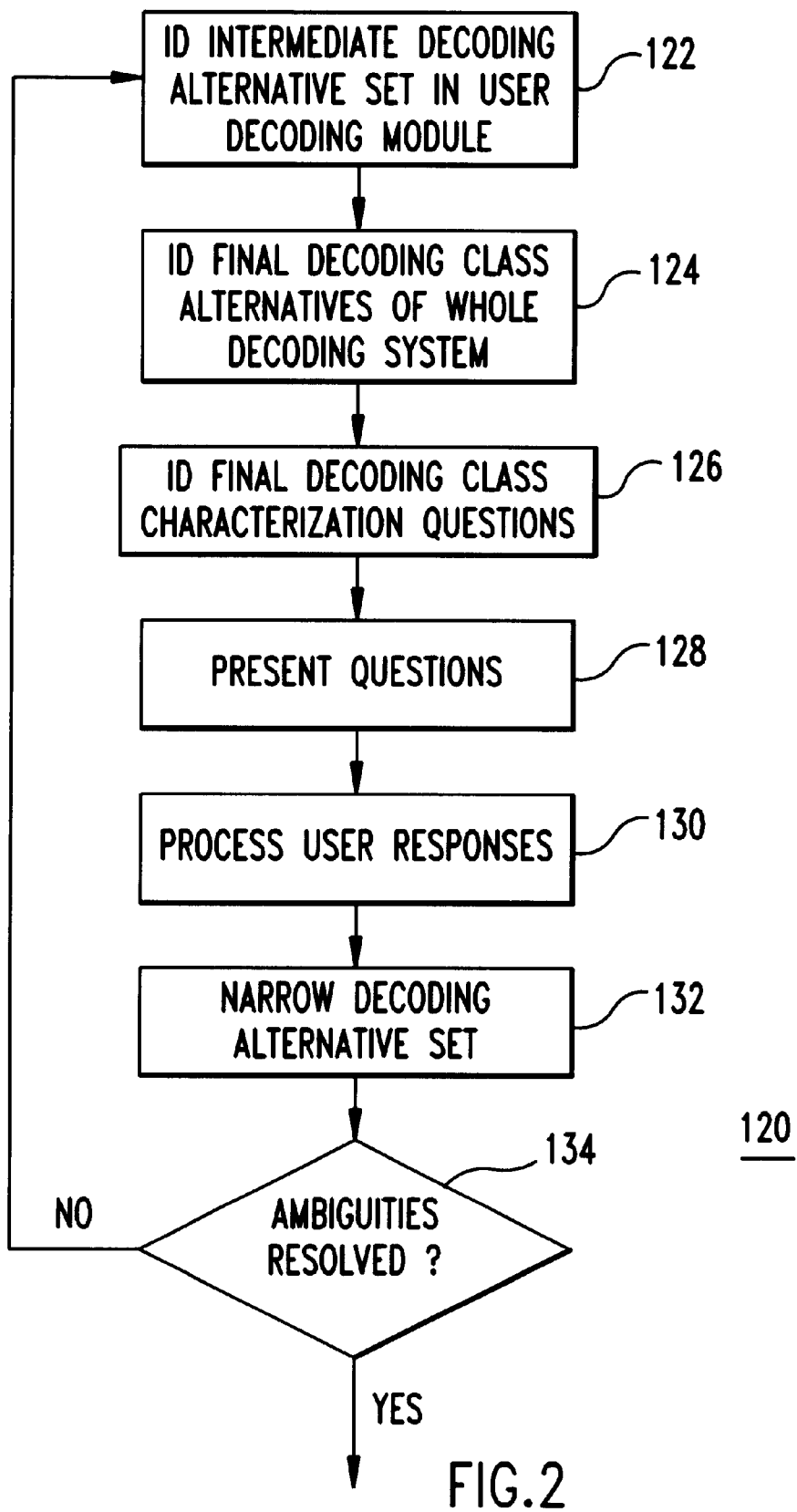
FIG. 2 is a flow diagram of the preferred embodiment language recognition method of resolving decoding ambiguities that occur in an inner module of an interactive conversational decoding system.

FIG. 2 is a flow diagram of the preferred embodiment language recognition method 120 of resolving decoding ambiguities by an inner module (fast match decode 108) of an interactive conversational decoding system. The inner module may include an acoustic processing module, a language model module, a semantic module, a syntactic module, a parser and/or a signal processing module. After identifying a decoding ambiguity a set of intermediate decoding alternatives are identified by the inner decoding module in step 122. Intermediate decoding alternatives may include those that are widely used by existing decoders. Such intermediate decoding alternatives may include, for example only, a candidate word list, a candidate phrase list, a candidate sentence list, a vocabulary, a fast match list, a detailed match list, an N-best list, a candidate acoustic feature set, a dialects and/or language set, a handwriting feature set, a phoneme set, a letter set, a channel and/or environment condition (noise, music etc.) set.

Next, in step 124 final decoding alternatives classes are identified for the whole decoding system. The set of intermediate decoding alternatives determine the potential final decoding class alternatives. In one preferred embodiment the final decoding alternative classes belong to the same set as the intermediate decoding alternatives. In this embodiment only the choices/alternatives are reduced in the final set. So, the decoder using the "list of candidate phrases" as a criteria for selecting alternatives may select "meet at heaven" and "meet at seven" as possible alternatives at the intermediate stage. Then, the final decoding alternative will be narrowed to "meet at seven."

Examples of final decoding alternatives that would not belong to the set of final decoding alternatives include acoustic data mapped to cepstra by the decoder. The decoder may have several different processes for mapping acoustic data to cepstra that depend on gender, age and nationality. Thus, the decoder may identify speaker characteristics, automatically, before mapping acoustic data into cepstra. In this example, if the decoder is unable to select between choices that are characteristic to the speaker, then the decoder may ask the user a gender related question. This type of intermediate question is not directly related to the final decoding alternatives.

The potential final decoding alternative classes may be selected to include features such as, for example, time, space, duration, and semantic class. Further, the potential final decoding alternative classes may include more general classes such as a grammatical class directed to grammatical structure, sentence parsing, word type; a personal characteristics class directed to sex, age, profession or a personal profile; a class of topics including medical, legal, personal and business topics; a class of goals such as what to buy, where to go, where or how to rest where to vacation; a business model class such as ordering tickets, ordering goods, requesting information, making a purchase; and/or, a customer profile class including various customers buying habits and needs. The final decoding alternatives will belong to one or more classes that are created based on these features. In the above example, "meet at-heaven" would belong to a space class, while "meet at seven" would belong to a time class. By identifying the appropriate classes for a particular domain, and matching the particular phrase/choice/alternative a particular class prior to decoding, the system will ask the appropriate question to eliminate the ambiguity.

So, in step 126 appropriate questions are selected, preferably, each to halve the number of alternative class choices. The selected questions have been previously matched to each previously identified class and characterize the identified final decoding alternative classes. Next, in step 128, the questions are presented to the user. In the above example, an appropriate question may be "Are you talking about a place to meet?" If the answer to this question is "YES" then, the system selects the alternative "meet at heaven;" if the answer is "NO" then "meet at seven" is selected. Appropriate questions must just discriminate between classes and need not discriminate between particular words.

Having queried the user, the user's responses, which may be verbal, typed or mouse activity, are processed in step 130 converting the response to something usable by the decoding system. Based on the user's response, in step 132 the set of intermediate decoding alternatives is narrowed, eliminating choices that are incongruous with the user's response. If it is determined in step 134 that all ambiguities have been resolved, then full decoding cycle is resumed to produce the final decoding output using the narrowed set of intermediate decoding alternatives.

Figure 3:
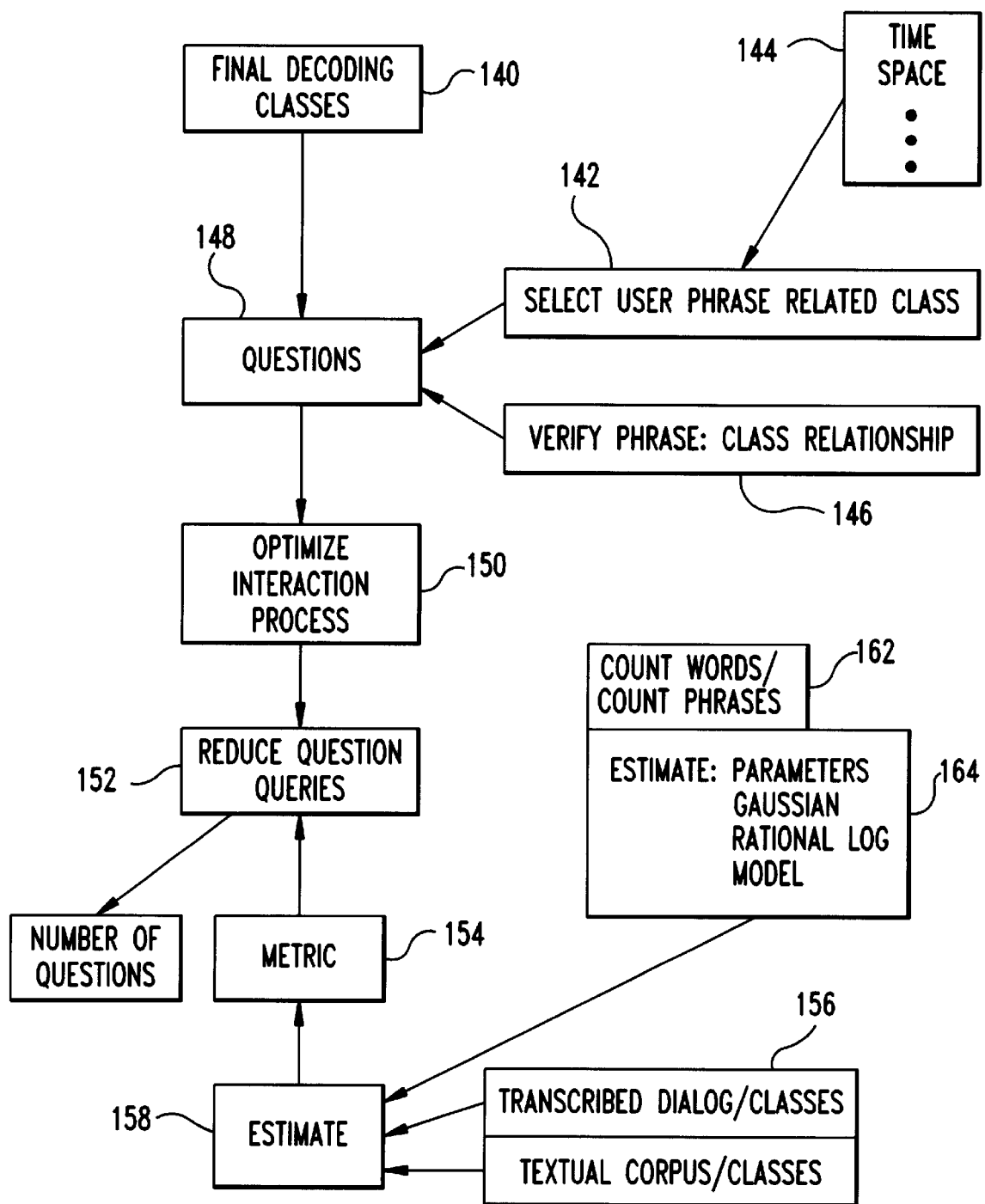
FIG. 3 is a flow diagram showing how questions are generated.

FIG. 3 is a flow diagram showing question generation in step 126. The set of final decoding class alternatives 140 are generated in step 124. In step 142, user related classes are selected from an established class list 144. Questions associated with any particular class may ask whether user phrases are related to or, belong to a specific class or, are about the relationship between classes that are associated with the decoding alternatives. In step 146 the relationship between the class and the phrase is verified.

Once appropriate questions 148 have been identified and verified, the list of questions is optimized in step 150 such that the questions selected minimize the number of questions 152 eventually presented to the user and with sufficient selectivity. Further, question optimization 150 may be based on probability metrics 154 of final decoding alternative classes that provide a measure of probability of eliminating each question class in the course of question queries. Training data, stored as transcribed dialogs 156 between users and service providers may be labeled with classes to provide a basis for an estimate 158 that serves as the probability metric 154. Training data stored as a textual corpus 160 previously labeled with classes may also provide a basis for the estimate 158. Further, the estimate of probability metrics 158 may be denied from counting words or phrases 162 belonging to classes and sequences of classes and, estimating probabilities of the class sequences for given sequences of words from these counts. Also, probability model parameters estimates 164 may be used, such as Gaussian models, normal log models, Laplacian models, etc.

Further, classes may be selected based on a particular type of activity to which the language recognition is related such as a business activity, e.g., ordering tickets, ordering goods, requesting information, or a purchase. To further facilitate classification for a business using the preferred language recognition system, a customer profile may be maintained with customer related information such as the customer's buying habits, buying needs, and buying history. The customer's profession, e.g., doctor, lawyer, may also be considered. If known, the user's ultimate goals may be considered. Thus, it may be advantageous to know whether the user is determining, for example, what to buy, where to go, where to rest, how to rest, a vacation destination.

Thus, through intermediate ambiguity classification the preferred embodiment language recognition system improves the likelihood of expeditiously achieving the correct result without burdening the user with an unending string of questions.

While the invention has been described in terms of preferred embodiments, those skilled in the art will recognize that the invention can be practiced with modification within the spirit and scope of the appended claims.

We claim:

1. A language recognition system for recognizing language input, said language input including ambiguous statements, said system being capable of recognizing and resolving certain ones of said ambiguous statements, said ambiguous statements being recognized as acceptable answers to two or more of who, what, when and where questions, said system comprising:

a decoder system receiving language input checking sentences in said language input for ambiguities and transcribing unambiguous language input;

an intermediate decoding module identifying a set of decoding alternatives corresponding to an ambiguity in an identified ambiguous sentence;

a classifier classifying each of said set of decoding alternatives as belonging to one ox a set of classes;

a questioner module constructing optimal questions responsive to said set of classes, said optimal questions being constructed to reduce the number of classes; and an assistant interactive system providing constructed said optimal questions and receiving corresponding responses.

2. A language recognition system as in claim 1, said decoder system comprising:

a fast match decode module receiving said language input and generating a potential candidate list for said ambiguous sentences; and a detailed match decode module receiving said potential candidate list from said fast match decode module when ambiguities are not found in said language input and receiving a classified input when said candidate list includes one or more ambiguities.

3. A Speech recognition system as in claim 2, wherein the decoder system is an automatic speech recognition system, said speech recognition system further comprising a microphone, speech input being provided from said microphone in response to a user speaking into said microphone.

4. A handwriting recognition system as in claim 2, wherein the decoder system is an automatic handwriting recognition system.

5. A language recognition method, said method comprising the steps of:

a) receiving language input and checking said language input for sentences recognized as acceptable answers to two or more of who, what, when and where questions, each recognized of said sentences being identified as an ambiguous sentence;

b) converting said language input to an output when an ambiguity is not found in said language input and returning to step (a); otherwise, c) identifying a set of intermediate decoding alternatives for an identified said ambiguous sentence;

d) identifying a plurality of final decoding class alternatives from said set of intermediate decoding alternatives;

e) identifying a final decoding class from said plurality of identified final decoding class alternatives;

f) presenting questions distinguishing features of members of said identified final decoding class; and g) resolving any ambiguity in said ambiguous sentence responsive to responses to said questions and returning to step (b).

6. A language recognition method as in claim 5, wherein the set of intermediate decoding alternatives identified in step (c) include a candidate word list, a candidate phrase list, a candidate sentence list, a vocabulary, a fast match list, a detailed match list, an N-best list, a candidate acoustic feature set, a dialects and/or language set, a handwriting feature set, a phoneme set, a letter set a channel, and an environment condition set.

7. A language recognition method as in claim 6, wherein the final decoding alternatives identified in step (d) include a candidate word list, a candidate phrase list, a candidate sentence list, a vocabulary, a fast match list, a detailed match list, an N-best list, a candidate acoustic feature set, a dialects and/or language set, a handwriting feature set, a phoneme set, a letter set, a channel and an environment condition set.

8. A language recognition method as in claim 5, wherein the questions presented in step (f) are selected to classify the identified ambiguous sentence as being related to one of at least a pair of classes selected from a plurality of feature classes.

9. A language recognition method as in claim 8, wherein the plurality of feature classes comprise:
   a temporal class;
   a spatial class;
   a durational class;
   a semantic class;
   a grammatical class;
   a personal characteristic class;
   a topical class;
   a goal related class;
   a business model class; and,
   a customer class.

10. A language recognition method as in claim 9, wherein the grammatical class comprises sentence structure, sentence parsing and word classification.

11. A language recognition method as in claim 9, wherein the personal characteristic class comprises a plurality of user characteristics including a personal profile, user sex, user age and user profession.

12. A language recognition method as in claim 9, wherein the topical class comprises a medical information class, a legal information class, a business information class and a personal information class.

13. A language recognition method as in claim 9, wherein the business model class includes business related activities including placing ticket orders, placing orders for goods, requesting information and making purchases.

14. A language recognition method as in claim 8, wherein the step (f) of presenting questions further comprises selecting questions from a plurality of questions, selected said questions being an optimum set of questions, said optimum set of questions selected to minimize the number of questions presented to a user and to minimize the number of potential alternatives remaining after receiving a user response.

15. A language recognition method as in claim 14, wherein the set of optimum questions are selected from a plurality of questions by determining a probability metric, the probability metric providing a measure of the probability that a response will eliminate one or more of said final decoding classes.

16. A language recognition method as in claim 15, wherein the probability metric is derived from training data.

17. A language recognition method as in claim 16, wherein the training data is a textual corpus labeled with classes.

18. A language recognition method as in claim 16, wherein the training data is a plurality of transcribed user-server dialogs labeled with classes.

19. A computer program product for language recognition, said computer program product comprising a computer usable medium having computer readable program code thereon, said computer readable program code comprising:
   computer readable program code means for checking language input for ambiguous statements, ambiguous statements being recognized as acceptable answers to two or more of who, what, when and where questions;
   computer readable program code means for converting said language input to an output; computer readable program code means for identifying a set of intermediate decoding alternatives for an identified ambiguous statement;
   computer readable program code means for identifying final decoding class alternatives for each said identified ambiguous statement from said set of intermediate decoding alternatives;
   computer readable program code means for identifying a final decoding class from said identified final decoding class alternatives;
   computer readable program code means for presenting questions about features of members of said identified final decoding class; and
   computer readable program code means for using final decoding class member features to resolve ambiguities in identified ambiguous statements.

20. A computer program product as in claim 19, wherein the computer readable program code means for presenting questions comprises:
   computer readable program code means for classifying each said identified ambiguous statement as being related to one of at least a pair of classes of a plurality of feature classes.

21. A computer program product as in claim 20, wherein the computer readable program code means for presenting questions further comprises:
   computer readable program code means for selecting an optimum set of questions from a plurality of questions, said optimum set of questions minimizing the number of questions presented and minimizing the number of potential alternatives remaining after receiving response to each presented question.

22. A computer program product as in claim 21, wherein the computer readable program code means for presenting questions further comprises:
   computer readable program code means for determining a probability metric from a plurality of questions, the probability metric being a measure of the probability that a response will eliminate one or more of said final decoding classes.

23. A computer program product as in claim 22, wherein the computer readable program code means for presenting questions further comprises:
   computer readable program code means for deriving the probability metric from training data.

* * * * *